(12) United States Patent
Beuerle et al.

(10) Patent No.: US 8,313,686 B2
(45) Date of Patent: Nov. 20, 2012

(54) FLEX RING BASE

(75) Inventors: Frederick C. Beuerle, Jackson, MI (US); G. David Lisch, Jackson, MI (US)

(73) Assignee: Amcor Limited, Hawthorn (AU)

( * ) Notice: Subject to any disclaimer, the term of this patent is extended or adjusted under 35 U.S.C. 154(b) by 617 days.

(21) Appl. No.: 12/367,002

(22) Filed: Feb. 6, 2009

(65) Prior Publication Data

US 2009/0202766 A1 Aug. 13, 2009

Related U.S. Application Data

(60) Provisional application No. 61/063,883, filed on Feb. 7, 2008.

(51) Int. Cl.
*B29C 49/30* (2006.01)
(52) U.S. Cl. .......... 264/534; 264/524; 264/531
(58) Field of Classification Search .......... None
See application file for complete search history.

(56) References Cited

U.S. PATENT DOCUMENTS

| | | | |
|---|---|---|---|
| 4,017,250 A | 4/1977 | Chang et al. | |
| 5,255,889 A | 10/1993 | Collette et al. | |
| 6,045,001 A | 4/2000 | Seul | |
| 6,090,334 A | 7/2000 | Matsuno et al. | |
| 6,635,217 B1 | 10/2003 | Britton | |
| 7,451,886 B2 | 11/2008 | Lisch et al. | |
| 2006/0255005 A1* | 11/2006 | Melrose et al. | 215/381 |

FOREIGN PATENT DOCUMENTS

| | | |
|---|---|---|
| EP | 0739703 | 10/1996 |
| EP | 1063076 | 12/2000 |
| JP | 03-076625 | 4/1991 |

OTHER PUBLICATIONS

Supplementary European Search Report dated May 21, 2012 in corresponding European Patent Application No. EP 09 70 8485 (six pages).

* cited by examiner

*Primary Examiner* — Monica A Huson
(74) *Attorney, Agent, or Firm* — Harness, Dickey & Pierce, P.L.C.

(57) ABSTRACT

Accordingly, the present disclosure provides a container and method of making a container. In one example, a preform is disposed into a mold cavity having a base forming assembly. The base forming assembly includes a base insert and a movable ring insert. The preform is blown against the mold cavity to form a body defining a base portion. The movable ring insert is advanced into the base portion to form a thinned flex point in the base portion while keeping the base insert fixed. The container is hot-filled with a commodity. The commodity is allowed to cool causing a vacuum in the container that results in the upward movement or inversion of a central inset portion defined at the thinned flex point.

13 Claims, 4 Drawing Sheets

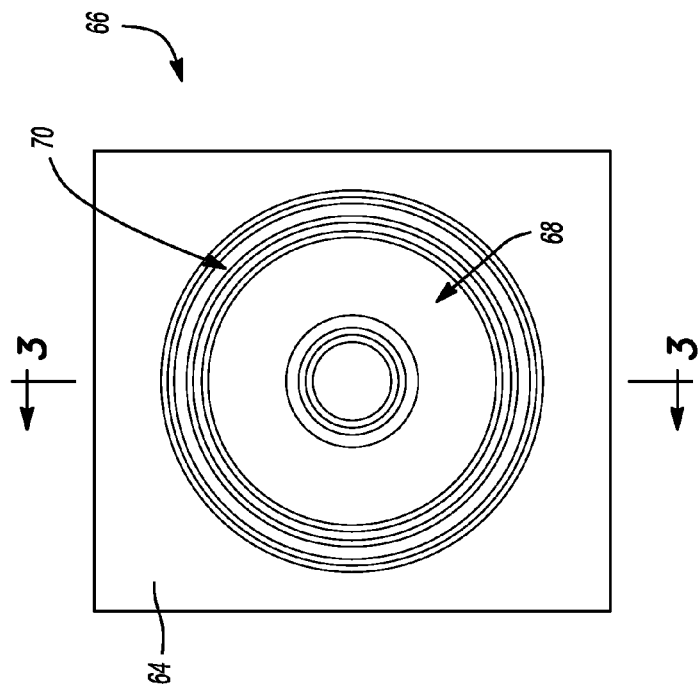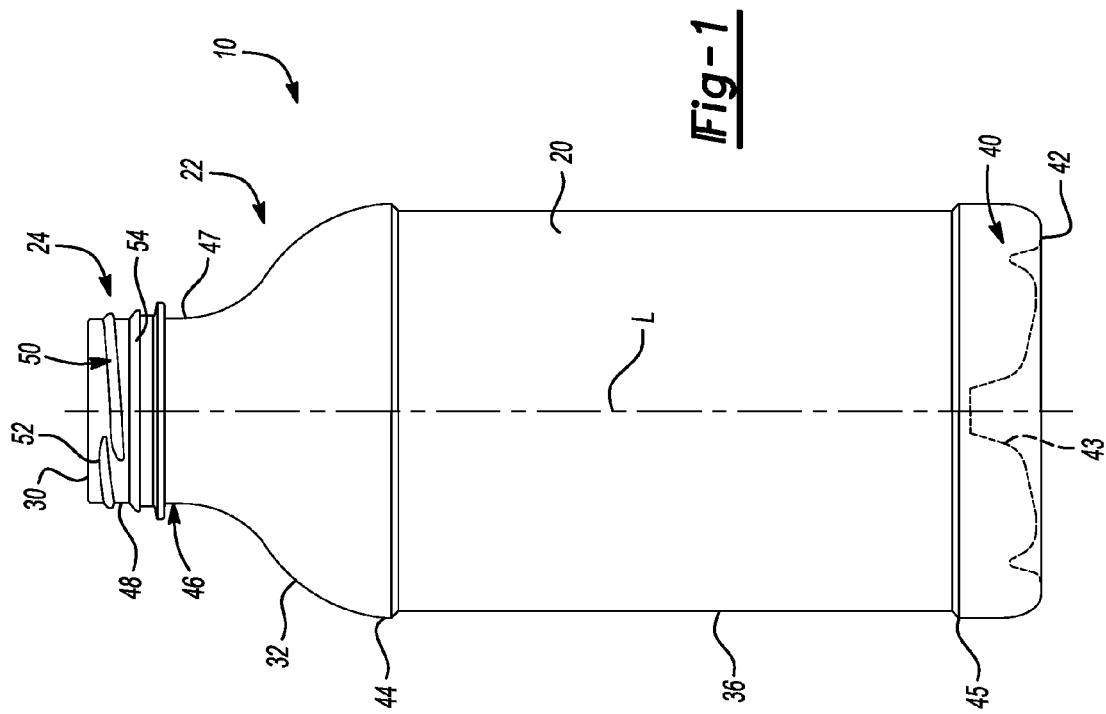

FLEX RING BASE

CROSS-REFERENCE TO RELATED APPLICATIONS

This application claims the benefit and priority of Ser. No. 61/063,883, filed Feb. 7, 2008. The entire disclosure of the above application is incorporated herein by reference.

TECHNICAL FIELD

This disclosure generally relates to containers for retaining a commodity, such as a solid or liquid commodity. More specifically, this disclosure relates to a blown polyethylene terephthalate (PET) container having a flex ring base and related method of making the same.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$, is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

In one method of forming such a plastic container, a mold assembly includes a base mechanism that raises a base insert and a ring insert up into position such as against a heel insert. In some instances, moving the base insert and the ring insert may require significant force to overcome internal pressures of the container.

SUMMARY

Accordingly, the present disclosure provides a plastic container and a method of making a plastic container. In one example, a preform is disposed into a mold cavity having a base forming assembly. The base forming assembly includes a base insert and a movable ring insert. The preform is blown against the mold cavity to form a body defining a base portion. The movable ring insert is advanced into the base portion to form a thinned flex point in the base portion while keeping the base insert fixed. The term "point" has been used herein to refer generally to a transition of thinned wall thickness. In this way, the term "point" can also generally include a line. The container is hot-filled with a commodity. The commodity is allowed to cool causing a vacuum in the container that results in a central inset portion defined at the thinned flex point to invert.

According to additional features, the preform is blown into a void defined between an annular space created by the base insert and a heel insert. The preform creates an annular projection in the void. The movable ring is subsequently advanced into the void to at least partially retract the annular projection of the preform into the base portion.

Additional benefits and advantages of the present disclosure will become apparent to those skilled in the art to which the present disclosure relates from the subsequent description and the appended claims, taken in conjunction with the accompanying drawings.

BRIEF DESCRIPTION OF THE DRAWINGS

FIG. 1 is a side elevational view of a plastic container constructed in accordance with the teachings of the present disclosure.

FIG. 2 is a plan view of a mold assembly including exemplary base forming portions according to the present teachings including a fixed base insert and a movable ring insert.

DETAILED DESCRIPTION

Figure 3:
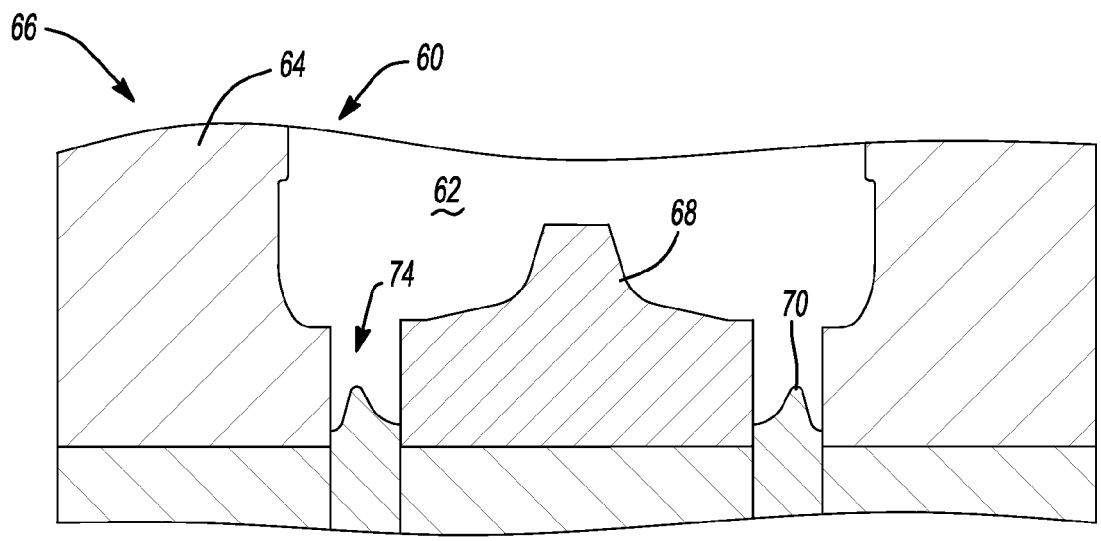
FIG. 3 is a partial cross-sectional view of the mold assembly of FIG. 2 used during formation of the plastic container shown in FIG. 1, the movable ring insert shown in a down position.

The following description is merely exemplary in nature, and is in no way intended to limit the disclosure or its application or uses.

FIG. 1 shows one preferred embodiment of the present container. In the Figures, reference number 10 designates a one-piece plastic, e.g. polyethylene terephthalate (PET), hot-fillable container. Those of ordinary skill in the art would appreciate that the following teachings are applicable to other containers, such as rectangular, triangular, hexagonal, octagonal or square shaped containers, which may have different dimensions and volume capacities. It is also contemplated that other modifications can be made depending on the specific application and environmental requirements.

The container 10 according to the present teachings defines a body 20 and includes an upper portion 22 having a finish 24. The finish 24 defines an opening 30 into the container 10. Integrally formed with the finish 24 and extending downward therefrom is a shoulder region 32. The shoulder region 32 merges into and provides a transition between the finish 24 and a sidewall portion 36. The sidewall portion 36 extends downward from the shoulder region 32 to a base portion 40 having a base 42. The base portion 40 defines a central inset portion 43. An upper bumper portion 44 may be defined at a transition between the shoulder region 32 and the sidewall portion 36. A lower bumper portion 45 may be defined at a transition between the base portion 40 and the sidewall portion 36. A neck 46 defining a cylindrical sidewall 47 is integrally formed with the finish 24 and extends between the finish 24 and the shoulder region 32. In one example, the cylindrical sidewall 47 can define a uniform radius along its entire height. The container 10 can define a central longitudinal axis L. As will become appreciated, the instant disclosure is directed toward the base portion 40 and the base 42. As such, the configuration of other portions of the container 10 may take on forms other than shown in FIG. 1. Likewise, the geometrical configurations of the base portion 40 and the base 42 are also exemplary as the teachings herein and are applicable to plastic containers and associated methods of making plastic containers having alternate configurations of the base portion 40 and the base 42.

The container 10 has been designed to retain a commodity. The commodity may be in any form such as a solid or liquid product. In one example, a liquid commodity may be introduced into the container 10 during a thermal process, typically a hot-fill process. For hot-fill bottling applications, bottlers generally fill the container 10 with a liquid or product at an elevated temperature between approximately 155° F. to 205° F. (approximately 68° C. to 96° C.) and seal the container 10 with a cap (not shown) before cooling. In addition, the container 10 may be suitable for other high-temperature pasteurization or retort filling processes or other thermal processes as well. In another example, the commodity may be introduced into the container 10 under ambient temperatures.

The finish 24 of the container 10 generally includes a radial sidewall 48 defining a threaded region 50 having threads 52, and a tamper evident (TE) band 54.

The container 10 according to the figures of the present disclosure is a blow molded, biaxially oriented container with a unitary construction from a single or multi-layer material. A well-known stretch-molding, heat-setting process for making the container 10 generally involves the manufacture of a preform (not shown) of a polyester material, such as polyethylene terephthalate (PET), having a shape well known to those skilled in the art similar to a test-tube with a generally cylindrical cross section and a length typically approximately fifty percent (50%) that of the container height.

Figure 4:
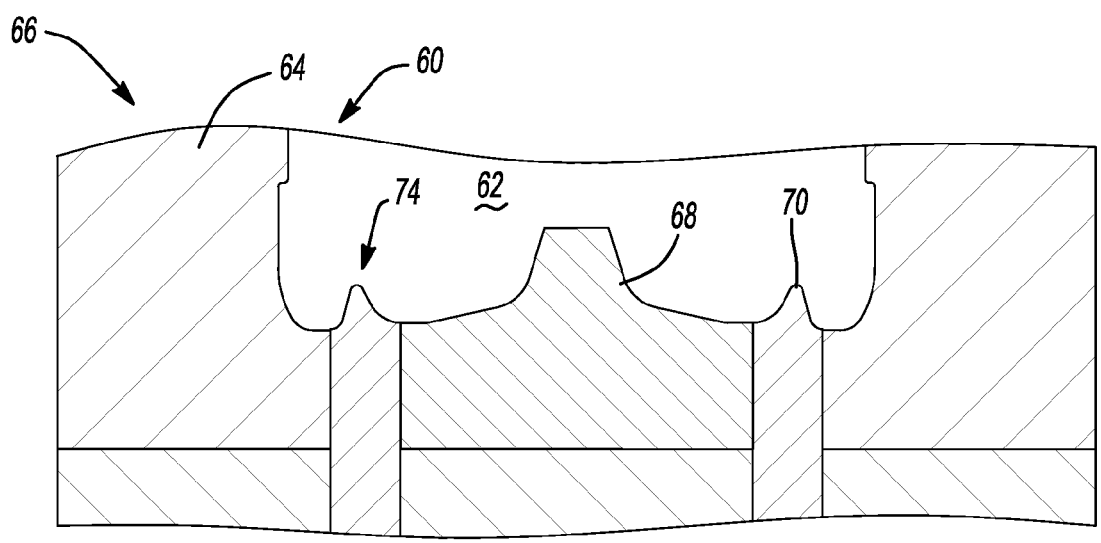
FIG. 4 is a partial cross-sectional view of the mold assembly of FIG. 3 shown with the movable ring insert in an up position.

Turning now to FIGS. 2-4, an exemplary mold assembly according to the present teachings is shown and generally identified at reference 60. The mold assembly 60 can generally define a mold cavity 62 (partially shown) and includes a first blow mold portion 64 (such as a heel insert, partially shown), and a base forming assembly 66. The base forming assembly 66 includes a fixed base mold insert 68 and a movable ring insert 70. According to one example, the first blow mold portion 64 can comprise or additionally include a heel insert or a body insert. As can be appreciated by those skilled in the art, the portions of the mold assembly 60 shown in FIGS. 3 and 4 only represent portions of a mold assembly directed toward formation of a base portion (i.e., 40) of a resultant plastic container (i.e., 10). As such, other mold inserts such as, but not limited to, a shoulder insert and/or others may be included.

An exemplary method of forming the container 10 will be described. Those skilled in the art will appreciate that the teachings of the instant disclosure are applicable toward plastic container formation by way of a traditional injection-stretch blow molding process or by a blown finish blow molding process. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish. In the blown finish blow molding process, the finish portion of the container is created in the blow mold. This alternative process enables production of a more lighter-weight finish portion, and thus container, than is possible through the traditional injection molding production method. During formation of a plastic container by way of the blown finish method, a moil portion is formed in the mold above the blown finish. The moil portion is severed from the blown finish, as is known in the art, to reveal the resultant container.

Figure 5:
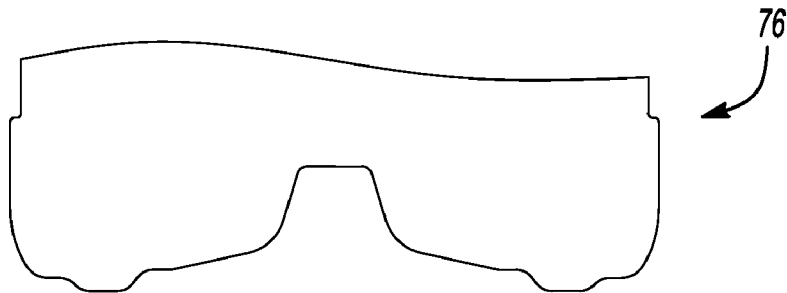
FIG. 5 is a side perspective view of an exemplary container base being formed by the mold assembly of FIG. 3 and representative of the movable ring insert of the mold assembly in the down position.

At the outset, a preform (not shown) may be placed into the mold cavity 62. In general, the mold cavity 62 has an interior surface corresponding to a desired outer profile of the blown container (i.e., 10). In one example, a machine (not illustrated) places the preform heated to a temperature between approximately 190° F. to 250° F. (approximately 88° C. to 121° C.) into the mold cavity 62. The mold cavity 62 may be heated to a temperature between approximately 250° F. to 350° F. (approximately 121° C. to 177° C.). A stretch rod apparatus (not illustrated) stretches or extends the heated preform within the mold cavity 62 to a length approximately that of an intermediate container (i.e., a structure collectively defined by a moil and the end container), thereby molecularly orienting the polyester material in an axial direction generally corresponding with the central longitudinal axis L of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold cavity 62 and further molecularly orienting the polyester material in a direction generally perpendicular to the axial direction, thus establishing the biaxial molecular orientation of the polyester material in most of the intermediate container. The polyester material is allowed to form into a void 74 (FIG. 3) created by the movable ring insert 70 in the down position (FIG. 3). As shown in FIG. 5, a container base 76 is illustrated during formation in the void 74. The container base 76 includes an annular projection having a concave profile.

Figure 6:
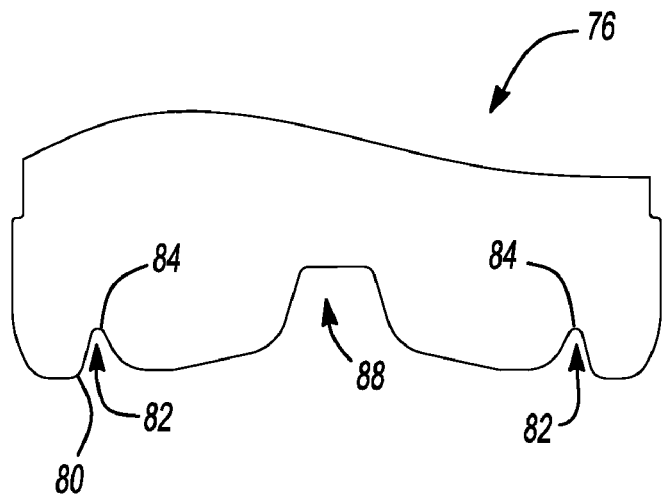
FIG. 6 is side perspective view of the exemplary container base of FIG. 5 and representative of the movable ring insert of the mold assembly in the up position.

At this point, the movable ring insert 70 of the base forming assembly 66 moves from the position shown in FIG. 3 (down position) under high pressure through an air chamber, to the position shown in FIG. 4 (up position). With additional reference to FIGS. 5 and 6, the exemplary container base 76 is shown corresponding to the base forming sequence of FIGS. 3 and 4, respectively. During translation of the movable ring insert 70 from the down position (FIG. 3) to the up position (FIG. 4), a heel 80 and a thinned flex point 82 are created in the container base 76 (FIG. 6). During advancement, the movable ring insert 70 moves in a direction long the longitudinal axis of the base 42 (i.e., the longitudinal axis L, FIG. 1).

As will be described, when the movable ring insert 70 translates upward, it inverts an annular hinge forming portion 84 defined at the thinned flex point 82 to a position shown in FIG. 6. The wall thickness of the polyester material at the annular hinge forming portion 84 is thereby thinned creating the flexibility required to allow an inner central portion 88 of the container base 76 to move upward or invert in response to vacuum forces resulting from hot-filling and subsequent cooling of the contents of the container. The annular hinge forming portion 84 and the thinned flex point 82 can be both defined as a continuous annular structure around the container base 76. In other examples, the hinge forming portion 84 and the thinned flex point 82 can be discontinuous or segmented around the container base 76. Notably, the fixed base mold insert 68 remains stationary during translation of the movable ring insert 70. As such, the desired flexible base (i.e., the inner central portion 88) can be formed using less force as compared to conventional push-up methods that involve movement of a base insert.

Figure 7:
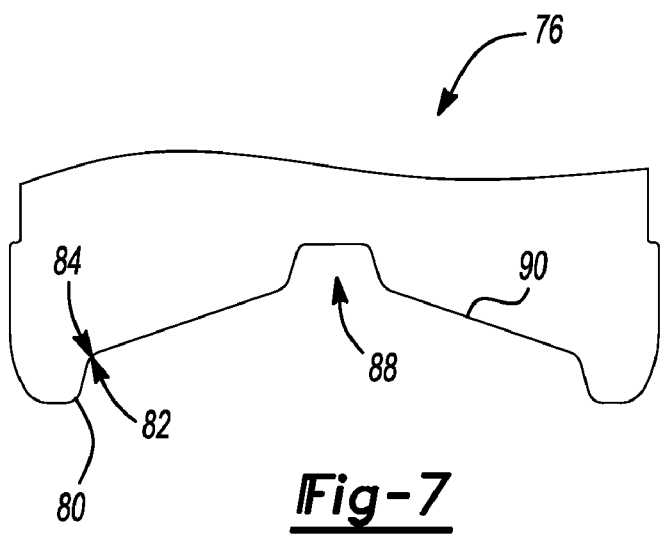
FIG. 7 is a side perspective view of the exemplary container base of FIG. 6 and representative of the center portion of the container base inverted subsequent to product cooling.

In one example, the pressurized air holds the mostly biaxial molecularly oriented polyester material against the mold cavity 62 for a period of approximately two (2) to five (5) seconds before removal of the plastic container 10 from the mold cavity 62. If the plastic container 10 is formed by the blown finish method, the moil (not shown) can be severed thereby creating a resultant plastic container 10. As can be appreciated, much less force is required to move just the movable ring insert 70 as compared to also requiring movement of the fixed base mold insert 68. A commodity can be introduced into the resultant plastic container 10 during a hot-fill process. When the resultant container 10 filled with hot product starts to cool, the inner central portion 88 of the container base 76 draws up under vacuum thus displacing volume. The inner central portion 88 of the container base 76 is illustrated subsequent to product cooling in FIG. 7. As can be appreciated, the thinned flex point 82 created by the movable ring insert 70 acts as a hinge to influence the vacuum action at the inner central portion 88 of the container base 76 during product cooling. The resulting vacuum forces cause the inner central portion 88 of the container base to move upward or invert, and define a central inset portion 90 (FIG. 7). It is appreciated that the description above with respect to the container base 76 and central inset portion 90 is applicable to the base 42 and inset portion 43 (FIG. 1).

Figure 8:
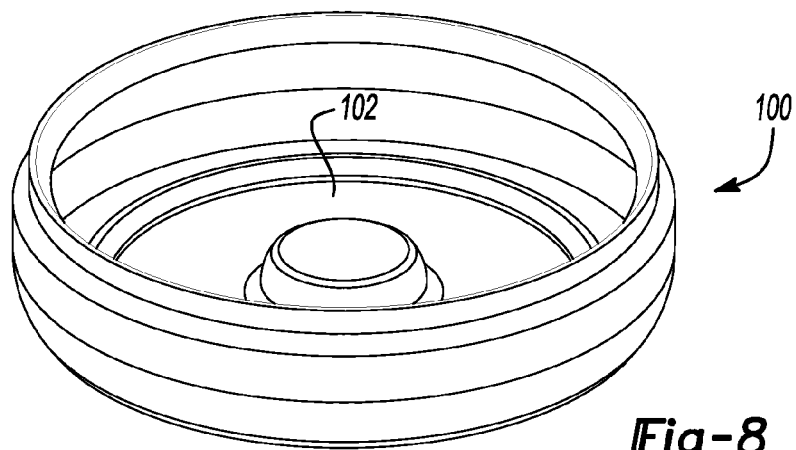
FIG. 8 is a perspective view of an exemplary base formed according to the present teachings according to additional features and shown prior to inversion of the base.
Figure 9:
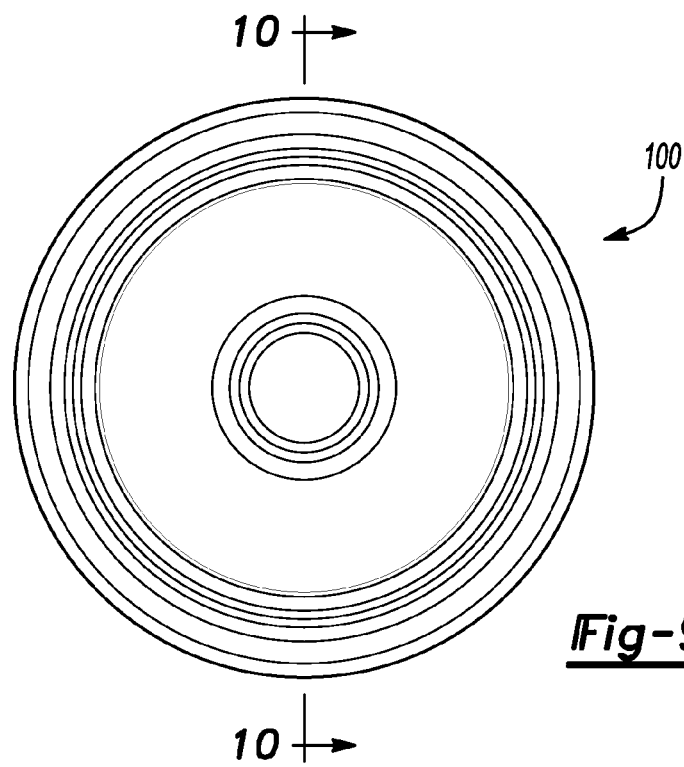
FIG. 9 is a plan view of the base of FIG. 8.
Figure 10:
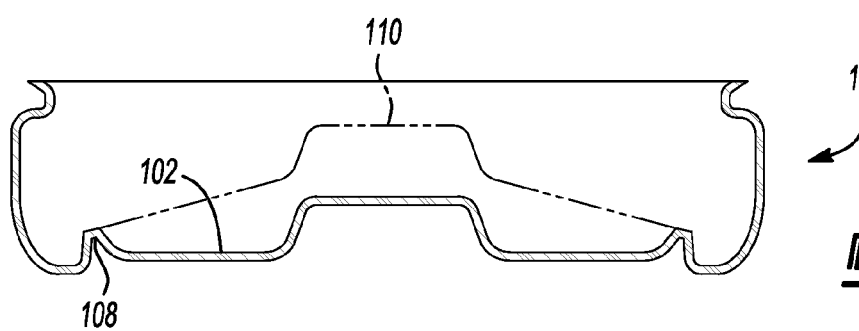
FIG. 10 is a cross-sectional view of the base of FIG. 9 taken along line 10-10, and shown with the base prior to upward movement or inversion (solid line) and subsequent to upward movement or inversion (phantom line).

With reference to FIGS. 8-10, a container base 100 according to additional features is shown. FIG. 10 illustrates a central portion 102 prior to cooling (solid line) and corresponds to the movable ring insert 70 in the up position (FIG. 3). A thinned flex point 108 created by the movable ring insert 70 acts as a hinge to influence the vacuum action at the central portion 102 of the container base 100 during product cooling. The resulting vacuum forces cause the central portion 102 of the container base 100 to move upward or invert and define a central inset portion 110 (phantom line).

Alternatively, other manufacturing methods using other conventional materials including, for example, high density polyethylene, polypropylene, polyethylene naphthalate (PEN), a PET/PEN blend or copolymer, and various multi-layer structures may be suitable for the manufacture of container 10. Those having ordinary skill in the art will readily know and understand container manufacturing method alternatives.

While the above description constitutes the present disclosure, it will be appreciated that the disclosure is susceptible to modification, variation and change without departing from the proper scope and fair meaning of the accompanying claims.

What is claimed is:

1. A method of making a blow-molded plastic container having a base portion that supports the container, the method comprising:
    disposing a preform into a mold having a base forming assembly that forms the base portion of the container, the base forming assembly including a base insert and a movable ring insert that is movable relative to the base insert;
    blowing the preform against the base forming assembly of the mold to form a body defining the base portion; and
    advancing the movable ring insert relative to the base insert while the base portion remains in the mold to advance the movable ring insert into the base portion to define a thinned flex point in the base portion.

2. The method of claim 1, further comprising:
    hot-filling the container with a commodity and allowing the commodity to cool causing a vacuum in the container that results in the upward movement of a central inset portion defined at the thinned flex point.

3. The method of claim 2 wherein blowing the preform comprises:
    blowing the preform into an annular space defined between the base insert and a heel insert, and
    creating an annular projection of the base portion in the void.

4. The method of claim 3 wherein the annular projection defines a concave profile.

5. The method of claim 3 wherein advancing the movable ring insert comprises:
    advancing the movable ring insert in the void to retract the annular projection of the base portion and to define the thinned flex point in the base portion.

6. The method of claim 1 wherein advancing the movable ring insert comprises:
    advancing a cylindrical member around the base insert.

7. The method of claim 3 wherein advancing the movable ring insert comprises:
    advancing the movable ring insert in a direction along a longitudinal axis of the body.

8. The method of claim 1 wherein advancing the movable ring insert inverts an annular hinge forming portion defined at the thinned flex point.

9. The method of claim 2 wherein the central inset portion is formed in the base portion subsequent to the thinned flex point being formed in the base portion.

10. The method of claim 1, wherein advancing the movable ring insert includes thinning of a wall thickness at the thinned flex point.

11. The method of claim 10, wherein blowing the preform against the base forming assembly includes forming an outer heel portion of the base portion, and wherein advancing the movable ring insert includes thinning of the wall thickness at the thinned flex point to less than an average wall thickness of the outer heel portion.

12. The method of claim 1, further comprising forming the thinned flex point to be continuously annular.

13. The method of claim 1, further comprising forming the thinned flex point to have a segmented annular structure.

* * * * *